US009307597B2

(12) United States Patent
Luo et al.

(10) Patent No.: US 9,307,597 B2
(45) **Date of Patent: *Apr. 5, 2016**

(54) SYSTEMS AND METHODS FOR CURRENT MATCHING OF LED STRINGS

(71) Applicant: GUANGZHOU ON-BRIGHT ELECTRONICS CO., LTD., Guangzhou (CN)

(72) Inventors: Qiang Luo, Guangzhou (CN); Lieyi Fang, Shanghai (CN); Zhiliang Chen, Guangzhou (CN)

(73) Assignee: Guangzhou On-Bright Electronics Co., Ltd., Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,120

(22) Filed: Dec. 9, 2014

(65) Prior Publication Data

US 2015/0084526 A1 Mar. 26, 2015

Related U.S. Application Data

(63) Continuation of application No. 13/558,168, filed on Jul. 25, 2012, now Pat. No. 8,947,012.

(30) Foreign Application Priority Data

Jul. 10, 2012 (CN) .......................... 2012 1 0237811

(51) Int. Cl.
*H05B 33/08* (2006.01)
*H05B 37/02* (2006.01)

(52) U.S. Cl.
CPC ........ *H05B 33/0842* (2013.01); *H05B 33/0827* (2013.01); *H05B 37/02* (2013.01)

(58) Field of Classification Search
None
See application file for complete search history.

(56) References Cited

U.S. PATENT DOCUMENTS 8,947,012 B2 2/2015 Luo et al.
2011/0199008 A1* 8/2011 Trattler et al. ............ 315/185 R (Continued)

FOREIGN PATENT DOCUMENTS

CN 101206493 A 6/2008
CN 101375499 A 2/2009

(Continued)

OTHER PUBLICATIONS

Ball, S.P., p. 399 of Tata McGraw-Hill Education, 2008, <retrieved on Mar. 28, 2014, retrieved from http://books.google.com/books?id=qm9QCvyiF2MC&pg=PA399&dq=operational+amplifier+vs+error+amplifier&hl=en&sa=X&ei=zZk1U9uoFuLQsQSL71GoBg&ved=0CDcQ6AEwAjgK#v=onepage&q=operational%20amplifier%20vs%20error%20amplifer&f=false>.

(Continued)

*Primary Examiner* — Douglas W Owens
*Assistant Examiner* — Dedei K Hammond
(74) *Attorney, Agent, or Firm* — Jones Day

(57) ABSTRACT

System and method are provided for regulating a string current flowing through a string of one or more light emitting diodes. A system controller includes a first controller terminal, a second controller terminal and a third controller terminal. The first controller terminal is coupled to a base terminal of a bipolar junction transistor, the bipolar junction transistor further including an emitter terminal and a collector terminal, the collector terminal being connected to the string of one or more light emitting diodes. The second controller terminal is coupled to the emitter terminal of the bipolar junction transistor and to a first resistor terminal of a resistor associated with a resistance. The third controller terminal is coupled to a second resistor terminal of the resistor. In addition, the system controller is configured to receive a reference voltage, receive an emitter voltage, and output a base current.

12 Claims, 4 Drawing Sheets

(56) References Cited

U.S. PATENT DOCUMENTS

| | | | |
|---|---|---|---|
| 2011/0199130 | A1 | 8/2011 | Hu et al. |
| 2014/0015429 | A1 | 1/2014 | Luo et al. |

FOREIGN PATENT DOCUMENTS

| | | | |
|---|---|---|---|
| CN | 102164434 | A | 8/2011 |
| TW | 200830076 | A | 7/2008 |

OTHER PUBLICATIONS

Chinese Patent Office, Office Action mailed Jan. 23, 2014 in Application No. 201210237811.4.

Taiwan Intellectual Property Office, Office Notice of Allowance mailed May 30, 2014 in Application No. 101127754.

* cited by examiner

SYSTEMS AND METHODS FOR CURRENT MATCHING OF LED STRINGS

1. CROSS-REFERENCES TO RELATED APPLICATIONS

This application is a continuation of U.S. patent application Ser. No. 13/558,168, filed Jul. 25, 2012, which claims priority to Chinese Patent Application No. 201210237811.4, filed Jul. 10, 2012, both of the above-referenced applications being commonly assigned and incorporated by reference herein for all purposes.

2. BACKGROUND OF THE INVENTION

The present invention is directed to integrated circuits. More particularly, the invention provides systems and methods for current matching. Merely by way of example, the invention has been applied to current matching of LED strings. But it would be recognized that the invention has a much broader range of applicability.

Light emitting diodes (LEDs) have been widely used in various electronics products, such as LED/LCD TVs. Often, a LED/LCD TV includes multiple LED strings. FIG. 1 is a simplified conventional diagram showing a system for driving multiple strings of LEDs. Each of the LED strings $\mathbf{102}_1, \ldots, \mathbf{102}_n$, where n is no less than 1, has one or more LEDs connected in series. The system 100 includes bipolar junction transistors $\mathbf{104}_1, \ldots, \mathbf{104}_n$ for driving the LED strings $\mathbf{102}_1, \ldots, \mathbf{102}_n$ respectively. In addition, the system 100 includes a controller 108. The emitter terminals $\mathbf{110}_1, \ldots, \mathbf{110}_n$ of the bipolar junction transistors (BJTs) $\mathbf{104}_1, \ldots, \mathbf{104}_n$ are connected to resistors $\mathbf{106}_1, \ldots, \mathbf{106}_n$, respectively. In order to match currents $\mathbf{112}_1, \ldots, \mathbf{112}_n$ flowing through the LED strings $\mathbf{102}_1, \ldots, \mathbf{102}_n$ respectively, voltages at the emitter terminals $\mathbf{110}_1, \ldots, \mathbf{110}_n$ are often kept equal or approximately equal in magnitude. However, conventional techniques often cannot match the LED currents with satisfactory accuracy, for example, due to the parameter variations of bipolar junction transistors.

Hence it is highly desirable to improve techniques of current matching of LED strings.

3. BRIEF SUMMARY OF THE INVENTION

The present invention is directed to integrated circuits. More particularly, the invention provides systems and methods for current matching. Merely by way of example, the invention has been applied to current matching of LED strings. But it would be recognized that the invention has a much broader range of applicability.

According to one embodiment, a system controller for regulating a string current flowing through a string of one or more light emitting diodes includes a first controller terminal, a second controller terminal, and a third controller terminal. The first controller terminal is coupled to a base terminal of a bipolar junction transistor, the bipolar junction transistor further including an emitter terminal and a collector terminal, the collector terminal being connected to the string of one or more light emitting diodes. The second controller terminal is coupled to the emitter terminal of the bipolar junction transistor and to a first resistor terminal of a resistor associated with a resistance. The third controller terminal is coupled to a second resistor terminal of the resistor. The system controller is configured to receive a reference voltage, receive an emitter voltage from the emitter terminal of the bipolar junction transistor through the second controller terminal, and output a base current related to the base terminal of the bipolar junction transistor through the first controller terminal based on at least information associated with the reference voltage and the emitter voltage. The system controller is further configured to receive a first current related to the emitter terminal of the bipolar junction transistor through the second controller terminal, the first current being equal to the base current in magnitude and regulate the emitter voltage to be equal to the reference voltage in magnitude.

According to another embodiment, a system controller for matching string currents flowing through strings of one or more light emitting diodes includes a first controller terminal, a second controller terminal, a third controller terminal, a fourth controller terminal, a fifth controller terminal and a sixth controller terminal. The first controller terminal is coupled to a first base terminal of a first bipolar junction transistor, the first bipolar junction transistor further including a first emitter terminal and a first collector terminal, the first collector terminal being connected to a first string of one or more light emitting diodes. The second controller terminal is coupled to the first emitter terminal of the first bipolar junction transistor and to a first resistor terminal of a first resistor associated with a first resistance. The third controller terminal is coupled to a second resistor terminal of the first resistor. The fourth controller terminal is coupled to a second base terminal of a second bipolar junction transistor, the second bipolar junction transistor further including a second emitter terminal and a second collector terminal, the second collector terminal being connected to a second string of one or more light emitting diodes. The fifth controller terminal is coupled to the second emitter terminal of the second bipolar junction transistor and to a third resistor terminal of a second resistor associated with a second resistance. In addition, the sixth controller terminal is coupled to a fourth resistor terminal of the second resistor. The system controller is configured to, receive a first reference voltage, receive a first emitter voltage from the first emitter terminal of the first bipolar junction transistor through the second controller terminal, and output a first base current related to the first base terminal of the first bipolar junction transistor through the first controller terminal based on at least information associated with the first reference voltage and the first emitter voltage. The system controller is further configured to receive a first current related to the first emitter terminal of the first bipolar junction transistor through the second controller terminal, the first current being equal to the first base current in magnitude regulate the first emitter voltage to be equal to the first reference voltage in magnitude. Furthermore, the system controller is configured to, receive a second reference voltage, receive a second emitter voltage from the second emitter terminal of the second bipolar junction transistor through the fifth controller terminal, and output a second base current related to the second base terminal of the second bipolar junction transistor through the fourth controller terminal based on at least information associated with the second reference voltage and the second emitter voltage. Additionally, the system controller is configured to receive a second current related to the second emitter terminal of the second bipolar junction transistor through the fifth controller terminal, the second current being equal to the second base current in magnitude and regulate the second emitter voltage to be equal to the second reference voltage in magnitude. The first reference voltage and the second reference voltage are the same in magnitude. The first resistance and the second resistance are the same in magnitude.

In one embodiment, a method for regulating a string current flowing through a string of one or more light emitting diodes includes receiving a reference voltage by a system controller including a first controller terminal, a second controller terminal and a third controller terminal, the first controller terminal being coupled to a base terminal of a bipolar junction transistor, the second controller terminal being coupled to a first resistor terminal of a resistor associated with a resistance, the third controller terminal being coupled to a second resistor terminal of the resistor. The method further includes receiving an emitter voltage from an emitter terminal of the bipolar junction transistor through the second controller terminal, the bipolar junction transistor further including a collector terminal connected to the string of one or more light emitting diodes. In addition, the method includes outputting a base current related to the base terminal of the bipolar junction transistor through the first controller terminal based on at least information associated with the reference voltage and the emitter voltage, receiving a first current related to the emitter terminal of the bipolar junction transistor through the second controller terminal, the first current being equal to the base current in magnitude, and regulating the emitter voltage to be equal to the reference voltage in magnitude.

In another embodiment, a method for matching string currents flowing through strings of one or more light emitting diodes includes receiving a first reference voltage by a system controller including a first controller terminal, a second controller terminal and a third controller terminal, the first controller terminal being coupled to a first base terminal of a first bipolar junction transistor, the second controller terminal being coupled to a first resistor terminal of a first resistor associated with a first resistance, a third controller terminal being coupled to a second resistor terminal of the first resistor. The method further includes receiving a first emitter voltage from a first emitter terminal of the first bipolar junction transistor through the second controller terminal, the first bipolar junction transistor further including a first collector terminal connected to a first string of one or more light emitting diodes. In addition, the method includes outputting a first base current related to the first base terminal of the first bipolar junction transistor through the first controller terminal based on at least information associated with the first reference voltage and the first emitter voltage, receiving a first current related to the first emitter terminal of the first bipolar junction transistor through the second controller terminal, the first current being equal to the first base current in magnitude, and regulating the first emitter voltage to be equal to the first reference voltage in magnitude. Furthermore, the method includes receiving a second reference voltage by the system controller further including a fourth controller terminal, a fifth controller terminal and a sixth controller terminal, the fourth controller terminal being coupled to a second base terminal of a second bipolar junction transistor, the fifth controller terminal being coupled to a third resistor terminal of a second resistor associated with a second resistance, the sixth controller terminal being coupled to a fourth resistor terminal of the second resistor. Moreover, the method includes receiving a second emitter voltage from a second emitter terminal of the second bipolar junction transistor through the fifth controller terminal, the second bipolar junction transistor further including a second collector terminal connected to a second string of one or more light emitting diodes, and outputting a second base current related to the second base terminal of the second bipolar junction transistor through the fourth controller terminal based on at least information associated with the second reference voltage and the second emitter voltage. The method further includes receiving a second current related to the second emitter terminal of the second bipolar junction transistor through the fifth controller terminal, the second current being equal to the second base current in magnitude and regulating the second emitter voltage to be equal to the second reference voltage in magnitude. The first reference voltage and the second reference voltage are the same in magnitude. The first resistance and the second resistance are the same in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for current matching. Merely by way of example, the invention has been applied to current matching of LED strings. But it would be recognized that the invention has a much broader range of applicability.

Figure 1:
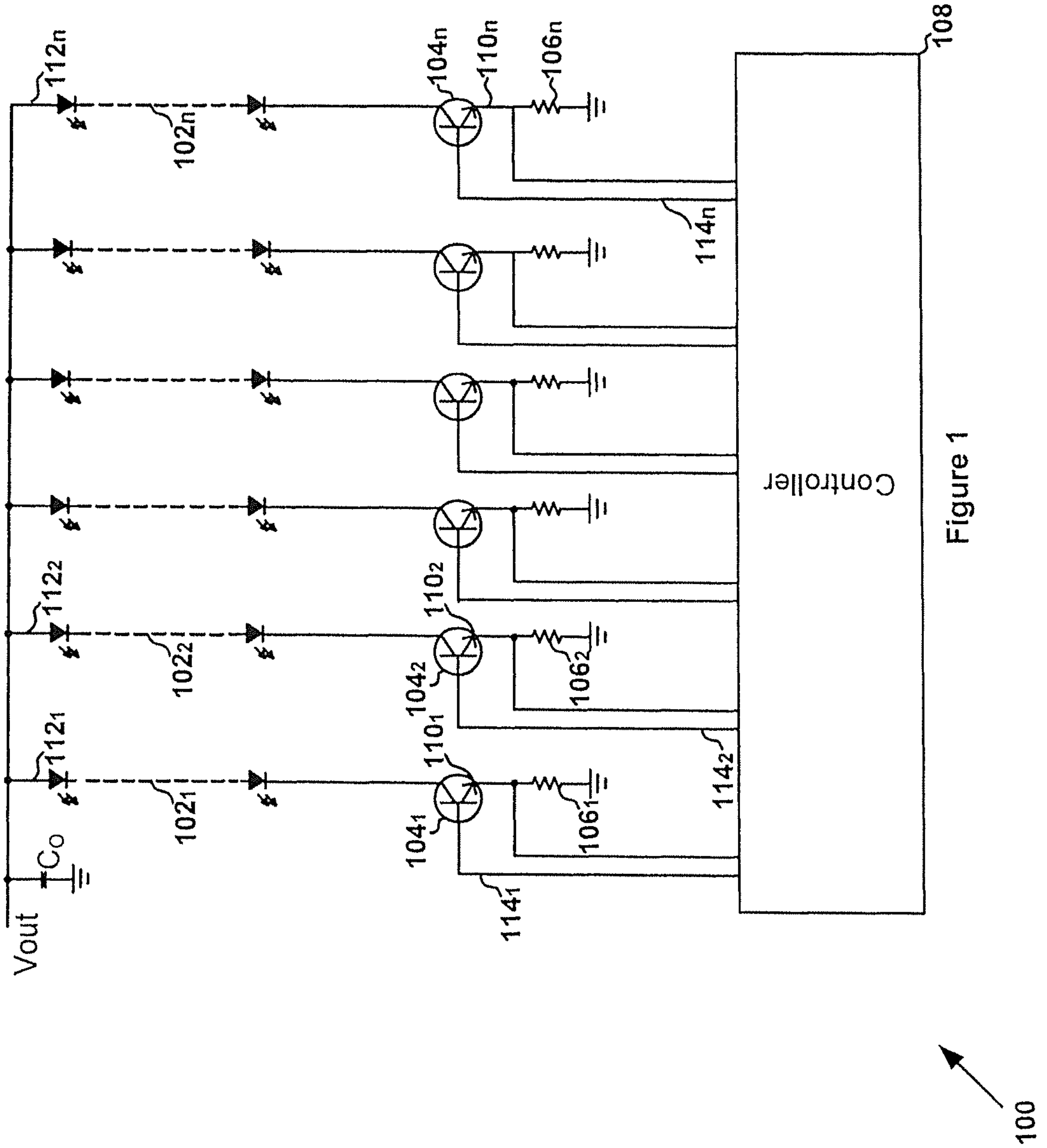
FIG. 1 is a simplified conventional diagram showing a system for driving multiple strings of LEDs.

Referring back to FIG. 1, a current flowing through a LED string can be determined based on the following equation:

$$I_{LED} = \frac{V_{emitter}}{R} - I_{base} \quad \text{(Equation 1)}$$

where $I_{LED}$ represents a LED current (e.g., the currents $\mathbf{112}_1, \ldots, \mathbf{112}_n$), $V_{emitter}$ represents an emitter voltage (e.g., the voltages at the emitter terminals $\mathbf{110}_1, \ldots, \mathbf{110}_n$), R represents a resistance (e.g., resistance of the resistors $\mathbf{106}_1, \ldots, \mathbf{106}_n$), and $I_{base}$ represents a base current (e.g., base currents $\mathbf{114}_1, \ldots, \mathbf{114}_n$ of the BJTs $\mathbf{104}_1, \ldots, \mathbf{104}_n$ respectively).

As shown in Equation 1, current matching of the LED strings $\mathbf{102}_1, \ldots, \mathbf{102}_n$ depends on the voltages at the emitter terminals $\mathbf{110}_1, \ldots, \mathbf{110}_n$, the resistance of the resistors $\mathbf{106}_1, \ldots, \mathbf{106}_n$, and the base currents $\mathbf{114}_1, \ldots, \mathbf{114}_n$. The voltages at the emitter terminals $\mathbf{110}_1, \ldots, \mathbf{110}_n$ can be matched by generating such voltages based on a single reference. The resistance of the resistors $\mathbf{106}_1, \ldots, \mathbf{106}_n$ can often be matched with satisfactory accuracy. However, the base currents $\mathbf{114}_1, \ldots, \mathbf{114}_n$ usually vary notably among different devices. Such mismatch of the base currents $\mathbf{114}_1, \ldots, \mathbf{114}_n$ may affect the LED current matching accuracy.

Figure 2:
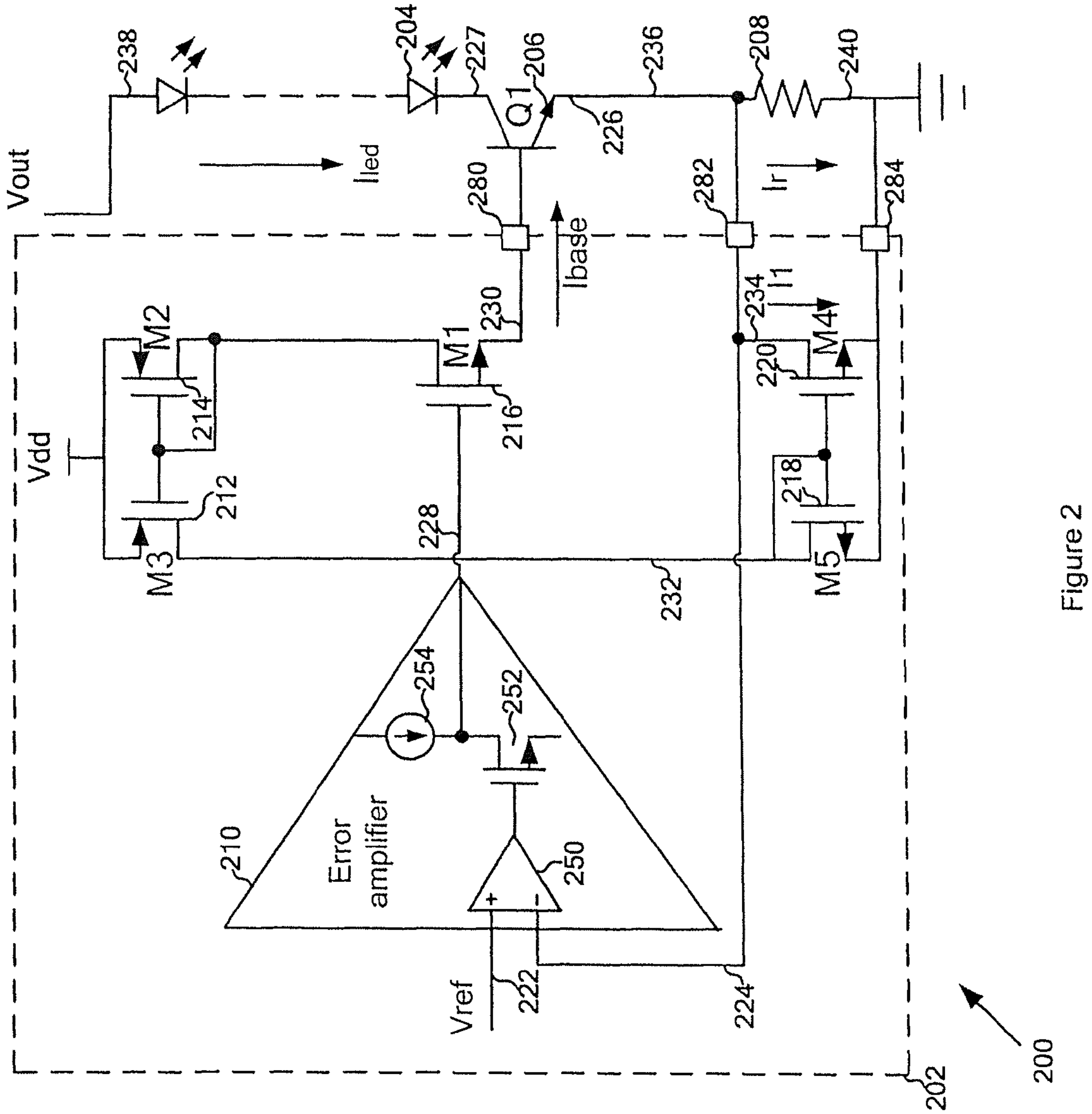
FIG. 2 is a simplified diagram showing certain components of a system for LED current matching according to an embodiment of the present invention.

FIG. 2 is a simplified diagram showing certain components of a system for LED current matching according to an embodiment of the present invention. This diagram is merely an example, which should not unduly limit the scope of the claims. One of ordinary skill in the art would recognize many variations, alternatives, and modifications. The system 200 includes a current-matching component 202, a BJT 206, and a resistor 208. In addition, the current-matching component 202 includes an error amplifier 210, and transistors 212, 214, 216, 218 and 220. For example, a collector terminal 227 of the BJT 206 is coupled to a LED string 204. In another example, the error amplifier 210 includes an amplifier 250, a transistor 252 and a current source 254. In yet another example, the current-matching component 202 includes three terminals 280, 282 and 284. In yet another example, the BJT 206 is a NPN BJT.

According to one embodiment, the error amplifier 210 receives a feedback signal 224 from an emitter terminal 226 of the BJT 206 and a reference signal 222, and outputs a signal 228 based on the difference between the reference signal 222 and the feedback signal 224 to the transistor 216. For example, a base current 230 (e.g., $I_{base}$) is generated for the BJT 206 through the terminal 280. In another example, the base current 230 is mirrored by at least the transistors 212 and 214 to generate a current 232 that flows through the transistor 218. In yet another example, the current 232 is mirrored by at least the transistors 218 and 220 to generate a current 234 (e.g., $I_1$) which flows through the transistor 220.

According to another embodiment, an emitter current 236 of the BJT 206 is determined based on the following equation:

$$I_{emitter}=I_{LED}+I_{base} \quad \text{(Equation 2)}$$

where $I_{emitter}$ represents the emitter current 236, $I_{LED}$ represents a current 238 flowing through the LED string 204 (e.g., a string current), and $I_{base}$ represents the base current 230. On the other hand, the emitter current 236 of the BJT 206 can be determined based on the following equation, for example:

$$I_{emitter}=I_r+I_1 \quad \text{(Equation 3)}$$

where $I_{emitter}$ represents a current 240 flowing through the resistor 208, and $I_1$ represents the current 234. Because the current 234 is generated based on current mirroring of the base current 230, the current 234 is equal to the base current 230 in magnitude according to certain embodiments. That is, $$I_1=I_{base} \quad \text{(Equation 4)}$$

According to Equation 2, Equation 3 and Equation 4, the current 238 flowing through the LED string 204 is equal in magnitude to the current 240 flowing through the resistor 208, as an example.

$$I_{LED}=I_r \quad \text{(Equation 5)}$$

For example, the feedback loop including the error amplifier 210, the transistor 216 and the BJT 206 is a voltage feedback control loop. In another example, the feedback signal 224 is regulated (e.g., set) to be equal or approximately equal in magnitude to the reference signal 222. Thus, the current 240 can be determined as follows, for example:

$$I_r = \frac{V_{ref}}{R} \quad \text{(Equation 6)}$$

where $V_{ref}$ represents the reference signal 222, and R represents the resistance of the resistor 208. In another example, the current 238 can be determined as follows:

$$I_{LED} = \frac{V_{ref}}{R} \quad \text{(Equation 7)}$$

Because a current flowing through a single LED string can be determined using a reference signal (e.g., the signal 222) and a resistor (e.g., 208) as shown in Equation 7, the currents flowing through the LED strings can be matched if a single reference voltage (e.g., the reference signal 222) is received by different error amplifiers (e.g., the amplifier 210) used for multiple LED strings and resistors (e.g., the resistor 208) connected to these LED strings in some embodiments.

According to certain embodiments, cascode structures can be used for mirroring the base current 230 to generate the current 234 so as to reduce systematic offset for satisfactory current sensing accuracy. However, if the base current 230 has a large magnitude (e.g., 10 mA or larger), current mirroring using cascode structures may cause headroom issues. Large systematic offset due to channel length modulation may occur, which may cause inaccuracy of LED current matching.

Figure 3:
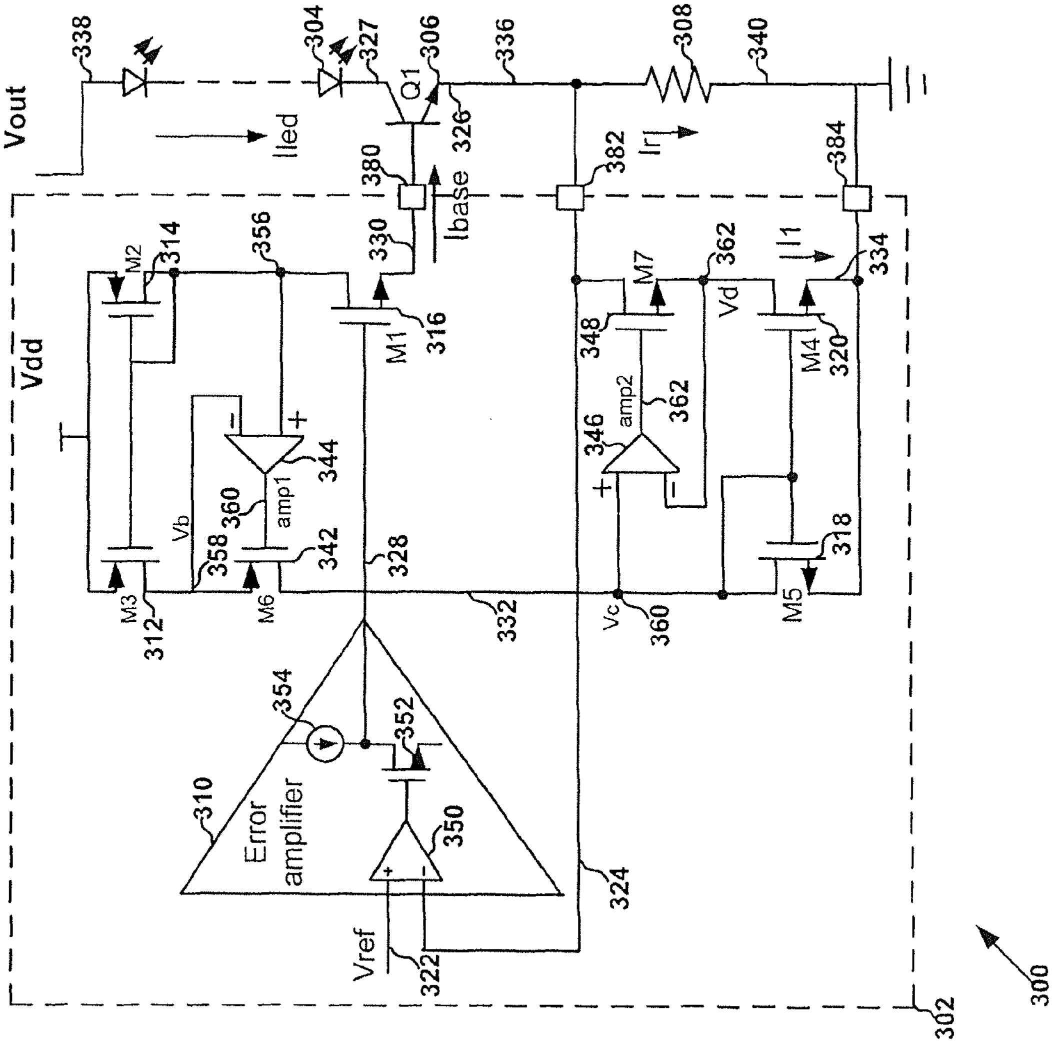
FIG. 3 is a simplified diagram showing certain components of a system for LED current matching according to another embodiment of the present invention.

FIG. 3 is a simplified diagram showing certain components of a system for LED current matching according to another embodiment of the present invention. This diagram is merely an example, which should not unduly limit the scope of the claims. One of ordinary skill in the art would recognize many variations, alternatives, and modifications. The system 300 includes a current-matching component 302, a BJT 306, and a resistor 308. In addition, the current-matching component 302 includes an error amplifier 310, amplifiers 344 and 346, and transistors 312, 314, 316, 318, 320, 342 and 348. For example, a collector terminal 327 of the BJT 306 is coupled to a LED string 304. In another example, the error amplifier 310 includes an amplifier 350, a transistor 352 and a current source 354. In yet another example, the BJT 306 is a NPN BJT.

According to one embodiment, the error amplifier 310 receives a feedback signal 324 from an emitter terminal 326 of the BJT 306 and a reference signal 322, and outputs a signal 328 based on the difference between the reference signal 322 and the feedback signal 324 to the transistor 316. For example, a base current 330 (e.g., $I_{base}$) is generated for the BJT 306. In another example, the base current 330 is mirrored by at least the transistors 312 and 314 to generate a current 332 that flows through the transistor 318. In yet another example, the current 332 is mirrored by at least the transistors 318 and 320 to generate a current 334 (e.g., $I_1$) which flows through the transistor 320. In yet another example, the current 334 is equal to the base current 330 in magnitude. In yet another example, the current 338 is equal to the current 340 in magnitude.

According to another embodiment, the amplifier 344 receives a voltage signal (e.g., $V_a$) from a terminal 356 of the transistor 314 and another voltage signal (e.g., $V_b$) from a terminal 358 of the transistor 312 and outputs a signal 360 to the transistor 342. For example, the voltage signal (e.g., $V_a$) at the terminal 356 and the voltage signal (e.g., $V_b$) at the terminal 358 are kept equal or approximately equal in magnitude. In another example, the amplifier 346 receives a voltage signal (e.g., $V_c$) from a terminal 360 of the transistor 318 and another voltage signal (e.g., $V_d$) from a terminal 362 of the transistor 320 and outputs a signal 362 to the transistor 348. In yet another example, the voltage signal (e.g., $V_c$) at the terminal 360 and the voltage signal (e.g., $V_d$) at the terminal 362 are kept equal or approximately equal in magnitude. Thus, the transistors 312 and 314 that are used for current mirroring do not have a systematic offset, and the transistors 318 and 320 that are used for current mirroring do not have a systematic offset according to certain embodiments.

As discussed above and further emphasized here, FIG. 2 and FIG. 3 are merely examples, which should not unduly limit the scope of the claims. One of ordinary skill in the art would recognize many variations, alternatives, and modifications. For example, the BJT 206 is a PNP BJT. The base current 230 flows from the BJT 206 to the terminal 280, and the current 234 flows from the transistor 220 to the terminal 282. In another example, the BJT 306 is a PNP BJT. In another example, the base current 330 flows from the BJT 306 to the terminal 380, and the current 334 flows from the transistor 320 to the terminal 382.

Figure 4:
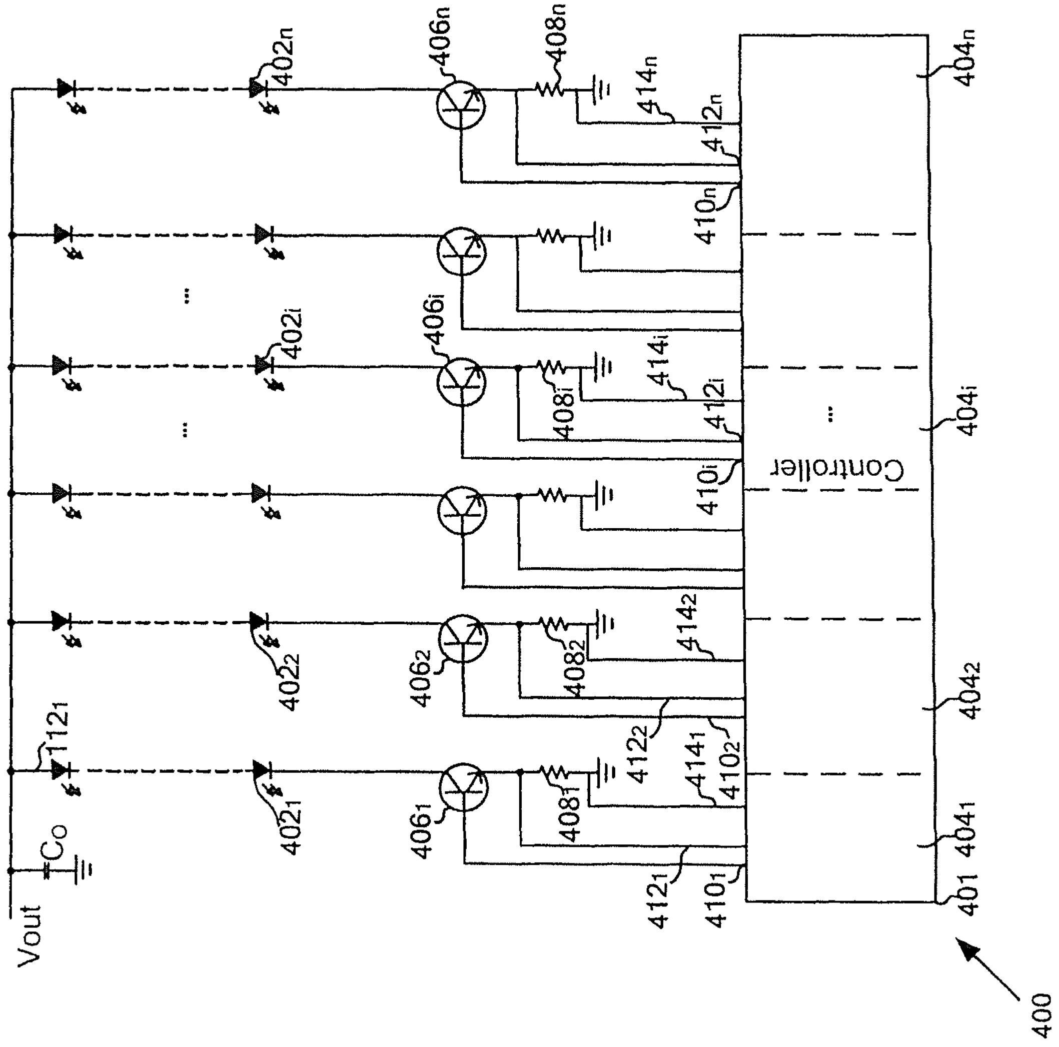
FIG. 4 is a simplified diagram showing a system for driving multiple strings of LEDs according to an embodiment of the present invention.

FIG. 4 is a simplified diagram showing a system for driving multiple strings of LEDs according to an embodiment of the present invention. This diagram is merely an example, which should not unduly limit the scope of the claims. One of ordinary skill in the art would recognize many variations, alternatives, and modifications. For example, the system 400 includes a controller 401 for driving LED strings $\mathbf{402}_1$, $\mathbf{402}_2$, . . . , $\mathbf{402}_i$ . . . , $\mathbf{402}_n$, where n is a positive integer (e.g., not smaller than 1) and i is a positive integer no smaller than 1 and no larger than n. The system 400 further includes bipolar junction transistors (BJTs) $\mathbf{406}_1$, $\mathbf{406}_2$, . . . , $\mathbf{406}_i$ . . . , $\mathbf{406}_n$ connected to the LED strings $\mathbf{402}_1$, $\mathbf{402}_2$, . . . , $\mathbf{402}_i$ . . . , $\mathbf{402}_n$ respectively. In another example, the emitter terminals of the BJTs $\mathbf{406}_1$, $\mathbf{406}_2$, . . . , $\mathbf{406}_i$ . . . , $\mathbf{406}_n$ are connected to resistors $\mathbf{408}_1$, $\mathbf{408}_2$, . . . , $\mathbf{408}_i$ . . . , $\mathbf{408}_n$, respectively. The controller 401 includes current-matching components $\mathbf{404}_1$, $\mathbf{404}_2$, . . . , $\mathbf{404}_i$ . . . , $\mathbf{404}_n$. For example, the current-matching component $\mathbf{404}_i$ includes three terminals $\mathbf{410}_i$, $\mathbf{412}_i$ and $\mathbf{414}_i$. In another example, the current-matching components $\mathbf{404}_1$, $\mathbf{404}_2$, . . . , $\mathbf{404}_i$ . . . , $\mathbf{404}_n$ are integrated onto a single chip.

In one embodiment, the current-matching component $\mathbf{404}_i$ is the same as the current-matching component 202. For example, the terminals $\mathbf{410}_i$, $\mathbf{412}_i$ and $\mathbf{414}_i$ are the same as the terminals 280, 282 and 284 respectively. In another example, the LED string $\mathbf{402}_i$ is the same as the LED string 204. In yet another example, the BJT $\mathbf{406}_i$ is the same as the BJT 206. In yet another example, the resistor $\mathbf{408}_i$ is the same as the resistor 208.

In yet another embodiment, the current-matching component $\mathbf{404}_i$ is the same as the current-matching component 302. For example, the terminals $\mathbf{410}_i$, $\mathbf{412}_i$ and $\mathbf{414}_i$ are the same as the terminals 380, 382 and 384 respectively. In another example, the LED string $\mathbf{402}_i$ is the same as the LED string 304. In yet another example, the BJT $\mathbf{406}_i$ is the same as the BJT 306. In yet another example, the resistor $\mathbf{408}_i$ is the same as the resistor 308.

According to another embodiment, a system controller for regulating a string current flowing through a string of one or more light emitting diodes includes a first controller terminal, a second controller terminal, and a third controller terminal. The first controller terminal is coupled to a base terminal of a bipolar junction transistor, the bipolar junction transistor further including an emitter terminal and a collector terminal, the collector terminal being connected to the string of one or more light emitting diodes. The second controller terminal is coupled to the emitter terminal of the bipolar junction transistor and to a first resistor terminal of a resistor associated with a resistance. The third controller terminal is coupled to a second resistor terminal of the resistor. The system controller is configured to receive a reference voltage, receive an emitter voltage from the emitter terminal of the bipolar junction transistor through the second controller terminal, and output a base current related to the base terminal of the bipolar junction transistor through the first controller terminal based on at least information associated with the reference voltage and the emitter voltage. The system controller is further configured to receive a first current related to the emitter terminal of the bipolar junction transistor through the second controller terminal, the first current being equal to the base current in magnitude and regulate the emitter voltage to be equal to the reference voltage in magnitude. For example, the system controller is implemented according to at least FIG. 2, FIG. 3 and/or FIG. 4.

According to another embodiment, a system controller for matching string currents flowing through strings of one or more light emitting diodes includes a first controller terminal, a second controller terminal, a third controller terminal, a fourth controller terminal, a fifth controller terminal and a sixth controller terminal. The first controller terminal is coupled to a first base terminal of a first bipolar junction transistor, the first bipolar junction transistor further including a first emitter terminal and a first collector terminal, the first collector terminal being connected to a first string of one or more light emitting diodes. The second controller terminal is coupled to the first emitter terminal of the first bipolar junction transistor and to a first resistor terminal of a first resistor associated with a first resistance. The third controller terminal is coupled to a second resistor terminal of the first resistor. The fourth controller terminal is coupled to a second base terminal of a second bipolar junction transistor, the second bipolar junction transistor further including a second emitter terminal and a second collector terminal, the second collector terminal being connected to a second string of one or more light emitting diodes. The fifth controller terminal is coupled to the second emitter terminal of the second bipolar junction transistor and to a third resistor terminal of a second resistor associated with a second resistance. In addition, the sixth controller terminal is coupled to a fourth resistor terminal of the second resistor. The system controller is configured to, receive a first reference voltage, receive a first emitter voltage from the first emitter terminal of the first bipolar junction transistor through the second controller terminal, and output a first base current related to the first base terminal of the first bipolar junction transistor through the first controller terminal based on at least information associated with the first reference voltage and the first emitter voltage. The system controller is further configured to receive a first current related to the first emitter terminal of the first bipolar junction transistor through the second controller terminal, the first current being equal to the first base current in magnitude regulate the first emitter voltage to be equal to the first reference voltage in magnitude. Furthermore, the system controller is configured to, receive a second reference voltage, receive a second emitter voltage from the second emitter terminal of the second bipolar junction transistor through the fifth controller terminal, and output a second base current related to the second base terminal of the second bipolar junction transistor through the fourth controller terminal based on at least information associated with the second reference voltage and the second emitter voltage. Additionally, the system controller is configured to receive a second current related to the second emitter terminal of the second bipolar junction transistor through the fifth controller terminal, the second current being equal to the second base current in magnitude and regulate the second emitter voltage to be equal to the second reference voltage in magnitude. The first reference voltage and the second reference voltage are the same in magnitude. The first resistance and the second resistance are the same in magnitude. For example, the system controller is implemented according to at least FIG. 2, FIG. 3 and/or FIG. 4.

In one embodiment, a method for regulating a string current flowing through a string of one or more light emitting diodes includes receiving a reference voltage by a system controller including a first controller terminal, a second controller terminal and a third controller terminal, the first controller terminal being coupled to a base terminal of a bipolar junction transistor, the second controller terminal being coupled to a first resistor terminal of a resistor associated with a resistance, the third controller terminal being coupled to a second resistor terminal of the resistor. The method further includes receiving an emitter voltage from an emitter terminal of the bipolar junction transistor through the second controller terminal, the bipolar junction transistor further including a collector terminal connected to the string of one or more light emitting diodes. In addition, the method includes outputting a base current related to the base terminal of the bipolar junction transistor through the first controller terminal based on at least information associated with the reference voltage and the emitter voltage, receiving a first current related to the emitter terminal of the bipolar junction transistor through the second controller terminal, the first current being equal to the base current in magnitude, and regulating the emitter voltage to be equal to the reference voltage in magnitude. For example, the method is implemented according to at least FIG. 2, FIG. 3 and/or FIG. 4.

In another embodiment, a method for matching string currents flowing through strings of one or more light emitting diodes includes receiving a first reference voltage by a system controller including a first controller terminal, a second controller terminal and a third controller terminal, the first controller terminal being coupled to a first base terminal of a first bipolar junction transistor, the second controller terminal being coupled to a first resistor terminal of a first resistor associated with a first resistance, a third controller terminal being coupled to a second resistor terminal of the first resistor. The method further includes receiving a first emitter voltage from a first emitter terminal of the first bipolar junction transistor through the second controller terminal, the first bipolar junction transistor further including a first collector terminal connected to a first string of one or more light emitting diodes. In addition, the method includes outputting a first base current related to the first base terminal of the first bipolar junction transistor through the first controller terminal based on at least information associated with the first reference voltage and the first emitter voltage, receiving a first current related to the first emitter terminal of the first bipolar junction transistor through the second controller terminal, the first current being equal to the first base current in magnitude, and regulating the first emitter voltage to be equal to the first reference voltage in magnitude. Furthermore, the method includes receiving a second reference voltage by the system controller further including a fourth controller terminal, a fifth controller terminal and a sixth controller terminal, the fourth controller terminal being coupled to a second base terminal of a second bipolar junction transistor, the fifth controller terminal being coupled to a third resistor terminal of a second resistor associated with a second resistance, the sixth controller terminal being coupled to a fourth resistor terminal of the second resistor. Moreover, the method includes receiving a second emitter voltage from a second emitter terminal of the second bipolar junction transistor through the fifth controller terminal, the second bipolar junction transistor further including a second collector terminal connected to a second string of one or more light emitting diodes, and outputting a second base current related to the second base terminal of the second bipolar junction transistor through the fourth controller terminal based on at least information associated with the second reference voltage and the second emitter voltage. The method further includes receiving a second current related to the second emitter terminal of the second bipolar junction transistor through the fifth controller terminal, the second current being equal to the second base current in magnitude and regulating the second emitter voltage to be equal to the second reference voltage in magnitude. The first reference voltage and the second reference voltage are the same in magnitude. The first resistance and the second resistance are the same in magnitude. For example, the method is implemented according to at least FIG. 2, FIG. 3 and/or FIG. 4.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a string current flowing through a string of one or more light emitting diodes, the system controller comprising:

a first controller terminal coupled to a base terminal of a bipolar junction transistor, the bipolar junction transistor further including an emitter terminal and a collector terminal, the collector terminal being connected to a string of one or more light emitting diodes;

a second controller terminal coupled to the emitter terminal of the bipolar junction transistor and coupled to a first resistor terminal of a resistor associated with a resistance; and a third controller terminal coupled to a second resistor terminal of the resistor;

wherein the system controller is configured to:

receive an emitter voltage from the emitter terminal of the bipolar junction transistor through the second controller terminal;

output a base current related to the base terminal of the bipolar junction transistor through the first controller terminal based at least in part on the emitter voltage; and regulate the emitter voltage to be equal to a reference voltage in magnitude;

wherein the system controller further includes:

an error amplifier configured to receive the reference voltage and the emitter voltage and output an amplified signal based at least in part on the reference voltage and the emitter voltage;

a current generator configured to receive the amplified signal and generate the base current based at least in part on the amplified signal; and a current mirror component configured to regulate a first current to be equal to the base current in magnitude, wherein the first current is related to the emitter terminal;

wherein the current generator includes a first transistor including a first transistor terminal, a second transistor terminal and a third transistor terminal, the first transistor terminal being configured to receive the amplified signal, the third transistor terminal being coupled to the first controller terminal and configured to output the base current;

wherein the current-mirror component includes:

a second transistor including a fourth transistor terminal, a fifth transistor terminal and a sixth transistor terminal;

a third transistor including a seventh transistor terminal, an eighth transistor terminal and a ninth transistor terminal;

a fourth transistor including a tenth transistor terminal, an eleventh transistor terminal and a twelfth transistor terminal; and a fifth transistor including a thirteenth transistor terminal, a fourteenth transistor terminal and a fifteenth transistor terminal;

wherein:

the fourth transistor terminal is coupled to the seventh transistor terminal and the sixth transistor terminal;

the fifth transistor terminal is coupled to the eighth transistor terminal;

the sixth transistor terminal is coupled to the second transistor terminal;

the tenth transistor terminal is coupled to the thirteenth transistor terminal and the fourteenth transistor terminal;

the eleventh transistor terminal is coupled to the second controller terminal and configured to receive the first current;

the twelfth transistor terminal is coupled to the fifteenth transistor terminal; and the fourteenth transistor terminal is coupled to the ninth transistor terminal.

2. The system controller of claim 1 is further configured to regulate the string current to be equal to the reference voltage divided by the resistance.

3. The system controller of claim 1 is further configured to:

output the base current flowing to the base terminal of the bipolar junction transistor through the first controller terminal based at least in part on the reference voltage and the emitter voltage; and receive the first current flowing from the emitter terminal of the bipolar junction transistor through the second controller terminal, the first current being equal to the base current in magnitude.

4. The system controller of claim 3 wherein the bipolar junction transistor is an NPN bipolar junction transistor.

5. The system controller of claim 1 is further configured to:

output the base current flowing from the base terminal of the bipolar junction transistor through the first controller terminal based at least in part on the reference voltage and the emitter voltage; and receive the first current flowing to the emitter terminal of the bipolar junction transistor through the second controller terminal, the first current being equal to the base current in magnitude.

6. The system controller of claim 5 wherein the bipolar junction transistor is a PNP bipolar junction transistor.

7. A system controller for regulating a string current flowing through a string of one or more light emitting diodes, the system controller comprising:

a first controller terminal coupled to a base terminal of a bipolar junction transistor, the bipolar junction transistor further including an emitter terminal and a collector terminal, the collector terminal being connected to a string of one or more light emitting diodes;

a second controller terminal coupled to the emitter terminal of the bipolar junction transistor and coupled to a first resistor terminal of a resistor associated with a resistance; and a third controller terminal coupled to a second resistor terminal of the resistor;

wherein the system controller is configured to:

receive an emitter voltage from the emitter terminal of the bipolar junction transistor through the second controller terminal;

generate a base current related to the base terminal of the bipolar junction transistor through the first controller terminal based at least in part on the emitter voltage; and regulate the emitter voltage to be equal to a reference voltage in magnitude;

wherein the system controller further includes:

an error amplifier configured to receive the reference voltage and the emitter voltage and output an amplified signal based at least in part on the reference voltage and the emitter voltage;

a current generator configured to receive the amplified signal and generate the base current based at least in part on the amplified signal; and a current mirror component configured to regulate a first current to be equal to the base current in magnitude, the first current being related to the emitter terminal;

wherein the current generator includes a first transistor including a first transistor terminal, a second transistor terminal and a third transistor terminal, the first transistor terminal being configured to receive the amplified signal, the third transistor terminal being coupled to the first controller terminal and configured to generate the base current;

wherein the current-mirror component includes:

a second transistor including a fourth transistor terminal, a fifth transistor terminal and a sixth transistor terminal;

a third transistor including a seventh transistor terminal, an eighth transistor terminal and a ninth transistor terminal;

a fourth transistor including a tenth transistor terminal, an eleventh transistor terminal and a twelfth transistor terminal;

a fifth transistor including a thirteenth transistor terminal, a fourteenth transistor terminal and a fifteenth transistor terminal;

a sixth transistor including a sixteenth transistor terminal, a seventeenth transistor terminal and an eighteenth transistor terminal;

a seventh transistor including a nineteenth transistor terminal, a twentieth transistor terminal and a twenty-first transistor terminal;

a first amplifier including a first amplifier input terminal, a second amplifier input terminal and a first amplifier output terminal; and a second amplifier including a third amplifier input terminal, a fourth amplifier input terminal and a second amplifier output terminal;

wherein:

the fourth transistor terminal is coupled to the seventh transistor terminal and the sixth transistor terminal;

the fifth transistor terminal is coupled to the eighth transistor terminal;

the sixth transistor terminal is coupled to the second transistor terminal;

the ninth transistor terminal is coupled to the seventeenth transistor terminal and the first amplifier input terminal;

the tenth transistor terminal is coupled to the thirteenth transistor terminal and the fourteenth transistor terminal;

the eleventh transistor terminal is coupled to the twenty-first transistor terminal and the fourth amplifier input terminal;

the twelfth transistor terminal is coupled to the fifteenth transistor terminal;

the fourteenth transistor terminal is coupled to the eighteenth transistor terminal;

the sixteenth transistor terminal is coupled to the first amplifier output terminal;

the nineteenth transistor terminal is coupled to the second amplifier output terminal; and the twentieth transistor terminal is coupled to the second controller terminal.

8. The system controller of claim 7 is further configured to regulate a string current flowing through the string of one or more light emitting diodes to be equal to the reference voltage divided by the resistance.

9. The system controller of claim 7 is further configured to:

output the base current flowing to the base terminal of the bipolar junction transistor through the first controller terminal based at least in part on the reference voltage and the emitter voltage; and receive the first current flowing from the emitter terminal of the bipolar junction transistor through the second controller terminal, the first current being equal to the base current in magnitude.

10. The system controller of claim 9 wherein the bipolar junction transistor is an NPN bipolar junction transistor.

11. The system controller of claim 7 is further configured to:

output the base current flowing from the base terminal of the bipolar junction transistor through the first controller terminal based at least in part on the reference voltage and the emitter voltage; and receive the first current flowing to the emitter terminal of the bipolar junction transistor through the second controller terminal, the first current being equal to the base current in magnitude.

12. The system controller of claim 11 wherein the bipolar junction transistor is a PNP bipolar junction transistor.

* * * * *